US008356093B2

(12) United States Patent
Koizumi et al.

(10) Patent No.: US 8,356,093 B2
(45) Date of Patent: Jan. 15, 2013

(54) APPARATUS AND SYSTEM FOR ESTIMATING NETWORK CONFIGURATION

(75) Inventors: Akihiro Koizumi, Kawasaki (JP); Eri Kawai, Yokohama (JP); Yoji Ozawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 362 days.

(21) Appl. No.: 12/840,926

(22) Filed: Jul. 21, 2010

(65) Prior Publication Data
US 2011/0093579 A1    Apr. 21, 2011

(30) Foreign Application Priority Data

Oct. 20, 2009 (JP) ................................. 2009-240982

(51) Int. Cl.
*G06F 15/173* (2006.01)
(52) U.S. Cl. ........ 709/223; 709/224; 709/226; 709/252; 370/218; 370/254
(58) Field of Classification Search .......... 709/223–226, 709/252; 370/218, 254
See application file for complete search history.

(56) References Cited

U.S. PATENT DOCUMENTS

| | | | | |
|---|---|---|---|---|
| 7,113,698 | B1 * | 9/2006 | Ryhorchuk et al. | 398/10 |
| 7,743,129 | B2 * | 6/2010 | Hua et al. | 709/223 |
| 7,743,143 | B2 * | 6/2010 | Belgaied | 709/225 |
| 2003/0009556 | A1 * | 1/2003 | Motobayashi et al. | 709/224 |
| 2003/0107987 | A1 * | 6/2003 | Kinstler | 370/228 |
| 2005/0254645 | A1 * | 11/2005 | Shippy et al. | 380/28 |
| 2006/0256712 | A1 * | 11/2006 | Imajuku et al. | 370/218 |
| 2007/0106768 | A1 * | 5/2007 | Frietsch et al. | 709/223 |
| 2007/0258359 | A1 * | 11/2007 | Ogasawara et al. | 370/218 |
| 2008/0310421 | A1 * | 12/2008 | Teisberg et al. | 370/395.53 |
| 2009/0067324 | A1 * | 3/2009 | Licardie et al. | 370/225 |
| 2011/0279294 | A1 * | 11/2011 | Sagar | 341/87 |

FOREIGN PATENT DOCUMENTS

| | | |
|---|---|---|
| JP | 01-288038 | 11/1989 |
| JP | 2003-318901 | 11/2003 |

* cited by examiner

*Primary Examiner* — Wing F Chan
*Assistant Examiner* — Razu Miah
(74) *Attorney, Agent, or Firm* — Foley & Lardner LLP

(57) ABSTRACT

When a failure occurs in a network or in a network apparatus, a connection state of the network is changed. There is provided a network configuration estimating apparatus for knowing logical route information quickly after a failure occurrence in accordance with information collected from network apparatuses, although it is conventionally difficult to know this information quickly. The network configuration estimating apparatus executes: a process of generating network configuration information such as physical and logical topologies from information collected in advance; a process of monitoring a network failure; a process of calculating a network configuration to be estimated after a network failure occurrence, from the network configuration information generated in advance and network failure information; a process of visually displaying the calculated network configuration; and a process of managing history of calculated network configurations.

15 Claims, 20 Drawing Sheets

FIG. 3

| NW APPARATUS ID _5211 | NW APPARATUS IDENTIFICATION INFORMATION _5212 | PORT ID _5213 | PORT IDENTIFICATION INFORMATION _5214 |
|---|---|---|---|
| 1 | 1001 | 1 | 1.1 |
| 1 | 1001 | 2 | 1.2 |
| 1 | 1001 | 3 | 1.3 |
| 4 | 1004 | 1 | 4.1 |
| 4 | 1004 | 2 | 4.2 |
| : | | | |

FIG. 4

| NW APPARATUS ID _5221 | OWN PORT ID _5222 | ADJACENT PORT IDENTIFICATION INFORMATION _5223 |
|---|---|---|
| 1 | 3 | 4.1 |
| 4 | 1 | 1.3 |
| : | | |

FIG. 5

| ⌐5231 | ⌐5232 | ⌐5233 | ⌐5234 | ⌐5235 | ⌐5236 |
|---|---|---|---|---|---|
| LINK ID | CONNECTION NW APPARATUS 1 ID | NW APPARATUS 1 PORT ID | CONNECTION NW APPARATUS 2 ID | NW APPARATUS 2 PORT ID | STATE |
| 1 | 1 | 3 | 4 | 1 | UP |
| 2 | 1 | 4 | 2 | 2 | UP |
| 3 | 2 | 3 | 5 | 1 | UP |
| 4 | 5 | 4 | 6 | 2 | DOWN |
| 5 | 5 | 5 | 6 | 5 | UP |
| : | | | | | |

FIG. 6

| ⌐5241 | ⌐5242 |
|---|---|
| LA ID | LINK ID |
| 1 | 4.5 |
| : | |

FIG. 7

| RING ID 5251 | CONSTITUTING NW APPARATUSES 5252 | MASTER NODE ID 5253 | FORWARDING PORT ID 5254 | BLOCKING PORT ID 5255 | BELONGING VLAN ID 5256 | STATE 5257 |
|---|---|---|---|---|---|---|
| 1 | 1,2,5,4 | 4 | 4 | 1 | 10,20 | NORMAL |
| 1 | 1,2,5,4 | 4 | 1 | 4 | 30 | NORMAL |
| 2 | 2,3,6,5 | 6 | LA(2,5) | 1 | 10,20,30 | NORMAL |
| .. | | | | | | |

FIG. 8

| VLAN ID (5261) | CONSTITUTING NW APPARATUSES (ASSIGNED PORT IDS) (5262) |
|---|---|
| 10 | 1(3,4),2(2,4,3),3(2,3),4(1,3,4),5(1,2,4,5),6(1,2,3,5),7(1),8(1) |
| 20 | 1(3,4),2(2,4,3),3(2,3),4(1,3,4),5(1,2,4,5),6(1,2,3,5),7(1),8(1) |
| 30 | 1(3,4),2(2,4,3),3(2,3),4(1,3,4),5(1,2,4,5),6(1,2,3,5),7(1),8(1) |
| : | |

FIG. 9

| LOGICAL TOPOLOGY ID (5271) | CORRESPONDING VLAN (5272) | CONSTITUTING LINK GROUP (NW APPARTUS ID1, NW APPARATUS ID2) (5273) |
|---|---|---|
| 1 | 10 | (1,2)(2,3)(2,5)(4,5)(5,6)(4,7)(6,8) |
| 2 | 20 | (1,2)(2,3)(2,5)(4,5)(5,6)(4,7)(6,8) |
| 3 | 30 | (1,2)(2,5)(1,4)(5,6)(4,7)(6,8) |
| : | | |

FIG. 10

| HISTORY ID | STORE TIME | PHYSICAL TOPOLOGY | LOGICAL TOPOLOGY |
|---|---|---|---|
| 1 | 2009-9-1 10:11:23 | PHYSICAL TOPOLOGY INFORMATION 1 (1, 2, 4,···) | LOGICAL TOPOLOGY INFORMATION 1 ((1,2)(2,3)(2,5)(4,5)) LOGICAL TOPOLOGY INFORMATION 2 ((5,6)(4,7)(6,8)) |
| 2 | 2009-9-2 10:12:22 | PHYSICAL TOPOLOGY INFORMATION 2 (1, 2, 4,···) | LOGICAL TOPOLOGY INFORMATION 1 ((1,2)(2,3)(2,5)(4,5)) LOGICAL TOPOLOGY INFORMATION 2 ((5,6)(4,7)) |
| ·· | | | |

| PORT ID (1211) | PORT IDENTIFICATION INFORMATION (1212) |
|---|---|
| 1 | 4.1 |
| 2 | 4.2 |
| 3 | 4.3 |
| : | |

FIG. 13

| PORT ID (1221) | ADJACENT PORT IDENTIFICATION INFORMATION (1222) |
|---|---|
| 1 | 1.3 |
| 3 | 7.1 |
| 4 | 5.2 |

FIG. 14

| LA ID (1231) | PORT (1232) |
|---|---|
| 1 | 4 |
| 1 | 5 |
| : | : |

FIG. 15

| ~1241 | ~1242 | ~1243 | ~1244 | ~1245 |
|---|---|---|---|---|
| RING ID | MASTER NODE | FORWARDING PORT ID | BLOCKING PORT ID | BELONGING VLAN ID |
| 1 | Yes | 4 | 1 | 10,20 |
| 1 | Yes | 1 | 4 | 30 |
| ⋮ | | | | |

FIG. 16

| ~1251 | ~1252 |
|---|---|
| VLAN ID | ASSIGNED PORT ID |
| 10 | 1,3,4 |
| 20 | 1,3,4 |
| 30 | 1,3,4 |
| ⋮ | |

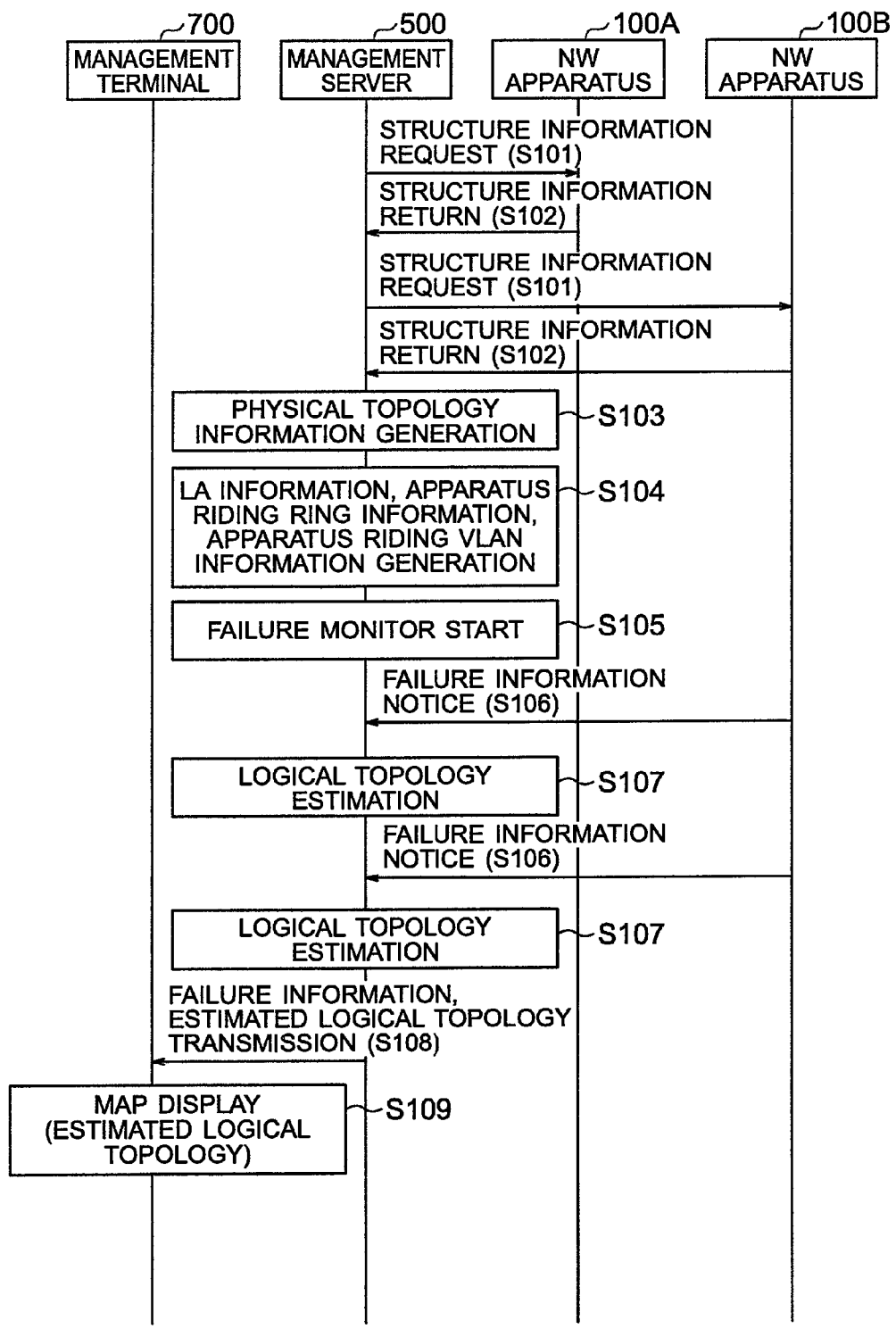

FIG. 18

| MESSAGE | TRANSMISSION SOURCE | TRANSMISSION DESTINATION | CONTENTS | |
|---|---|---|---|---|
| STRUCTURE INFORMATION REQUEST | MANAGEMENT SERVER | NW APPARATUS | •STRUCTURE INFORMATION TRANSMISSION REQUEST | ~S101 |
| STRUCTURE INFORMATION NOTICE | NW APPARATUS | MANAGEMENT SERVER | •PORT INFORMATION<br>•PHYSICAL CONNECTION INFORMATION<br>•LA INFORMATION<br>•RING INFORMATION<br>•VLAN INFORMATION | ~S102 |
| FAILURE INFORMATION NOTICE | NW APPARATUS | MANAGEMENT SERVER | •FAILURE INFORMATION (LINK UP/DOWN, NW APPARATUS UP/DOWN, RING SWITCHING (TO ABNORMAL STATE / TO NORMAL STATE)) | ~S106 |
| ESTIMATED LOGICAL TOPOLOGY TRANSMISSION | MANAGEMENT SERVER | MANAGEMENT TERMINAL | ESTIMATED LOGICAL TOPOLOGY | ~S108 |

FIG. 26
LOGICAL TOPOLOGY
NORMAL STATE
VLAN 10, 20
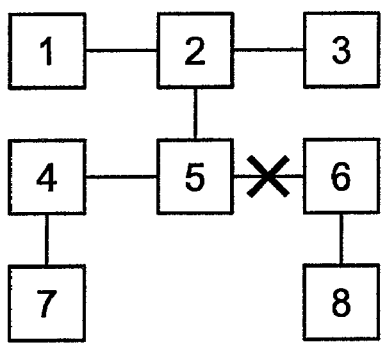
FAILURE BETWEEN NW APPARATUSES 5 AND 6
· LINK DOWN TRAP FROM NE APPARATUSES 5 AND 6
GENERATED, ESTIMATED
LOGICAL TOPOLOGY
ABNORMAL STATE
VLAN 10, 20
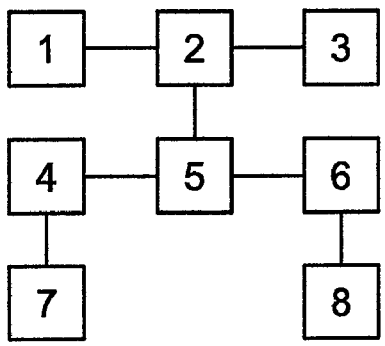

APPARATUS AND SYSTEM FOR ESTIMATING NETWORK CONFIGURATION

INCORPORATION BY REFERENCE

The present application claims priority from Japanese application JP2009-240982 filed on Oct. 20, 2009, the content of which is hereby incorporated by reference into this application.

BACKGROUND OF THE INVENTION

The present invention relates to an apparatus and system for managing the state of a network.

Together with widespread of the Internet, communication networks are used more and more by enterprises and organizations and occupy an important status as social infrastructure. If a failure occurs in a communication network, it is required to investigate the cause and take countermeasures. A management protocol called Simple Network Management Protocol (SNMP) is loaded in network apparatuses (hereinafter called an NW apparatus) constituting a communication network to establish a mechanism for detecting a failure rapidly by using an SNMP trap or performing alive monitoring of an NW apparatus itself by Internet Control Message Protocol ICMP.

Several methods have been developed for knowing a network state quickly when a failure occurs. For example, according to JP-A-1-288038, if all pieces of detailed information are collected from NW apparatuses when a failure occurs, it takes a fairly long time to process the collected information. The detailed information is therefore summarized in a subsystem, and failure information is analyzed from the summarized macro information. According to JP-A-2003-318901, if information is collected from all nodes when a network topology map is configured, it takes a long time. The topology map is therefore formed by using neighboring information possessed by each node to reduce a time taken to configure a topology map.

Although there are techniques of obtaining a network state quickly without collecting all pieces of information on NW apparatuses, there are no techniques of obtaining a network topology quickly by reflecting the influence of a failure when the failure occurs.

SUMMARY OF THE INVENTION

An NW apparatus has a management information database called a Management Information Base (MIB). It is possible to know connection information (Physical topology) of a network by collecting MIB information possessed by NW apparatuses. The NW apparatus has also a function of notifying or recording failure information by using an SNMP trap, a Syslog or the like. By analyzing the failure information, it becomes possible to know at which portion of the network or an NW apparatus the failure occurred.

When a failure occurs in a network or an NW apparatus, a connection state of the network is changed. In terms of management and operation of a network, it is important to know quickly how the connection state of the network was changed, in order to investigate the basic cause of the occurred failure and users to be influenced.

It is possible even in prior art to know quickly a change in a physical connection state, because it is sufficient to superpose the failure information upon a physical topology map of the network acquired in advance.

However, in order to know how a logical route was changed, it is necessary to verify the information including how a logical redundancy function operated. It is difficult to know quickly logical route information after the failure occurs.

In order to solve the above-described issue, the present invention provides a network configuration estimating apparatus or system which executes: a process of generating network configuration information such as physical and logical topologies from information collected in advance; a process of monitoring a network failure by using an SNMP trap, Syslog, ICMP or the like; a process of calculating a network configuration to be estimated after a network failure occurrence, from the network configuration information generated in advance and network failure information, by considering the state of a logical redundancy function such as rings and link aggregation (LA); a process of visually displaying the calculated network configuration; and a process of managing history of calculated network configurations.

According to the present invention, it becomes possible to know quickly, visually and time sequentially how a logical route changes upon network failure occurrence. A present network is complicated because a number of logical networks extend throughout a wideband physical network. When a failure occurs in a complicated network, a time taken to investigate a failure cause is shortened effectively by using the techniques of the present invention.

BRIEF DESCRIPTION OF THE DRAWINGS

FIG. 3 is a table illustrating an example of port information to be managed by the management server.

FIG. 4 is a table illustrating an example of physical connection information to be managed by the management server.

FIG. 5 is a table illustrating an example of physical topology information to be managed by the management server.

FIG. 6 is a table illustrating an example of LA information to be managed by the management server.

FIG. 7 is a table illustrating an example of apparatus striding ring information to be managed by the management server.

FIG. 8 is a table illustrating an example of apparatus riding VLAN information to be managed by the management server.

FIG. 9 is a table illustrating an example of logical topology information to be managed by the management server.

FIG. 10 is a table illustrating an example of NW configuration history information to be managed by the management server.

FIG. 12 is a table illustrating an example of port information possessed by the NW apparatus.

FIG. 13 is a table illustrating an example of physical connection information possessed by the NW apparatus.

FIG. 14 is a table illustrating an example of LA information possessed by the NW apparatus.

FIG. 15 is a table illustrating an example of ring information possessed by the NW apparatus.

FIG. 16 is a table illustrating an example of VLAN information possessed by the NW apparatus.

FIG. 17 is a sequence diagram illustrating a network estimating process of the present invention.

FIG. 18 is a diagram illustrating an example of a message to be used in the network estimating process.

FIG. 26 is a diagram illustrating an example of generation of an estimated logical topology (pattern 2).

DESCRIPTION OF THE EMBODIMENTS

Figure 1:
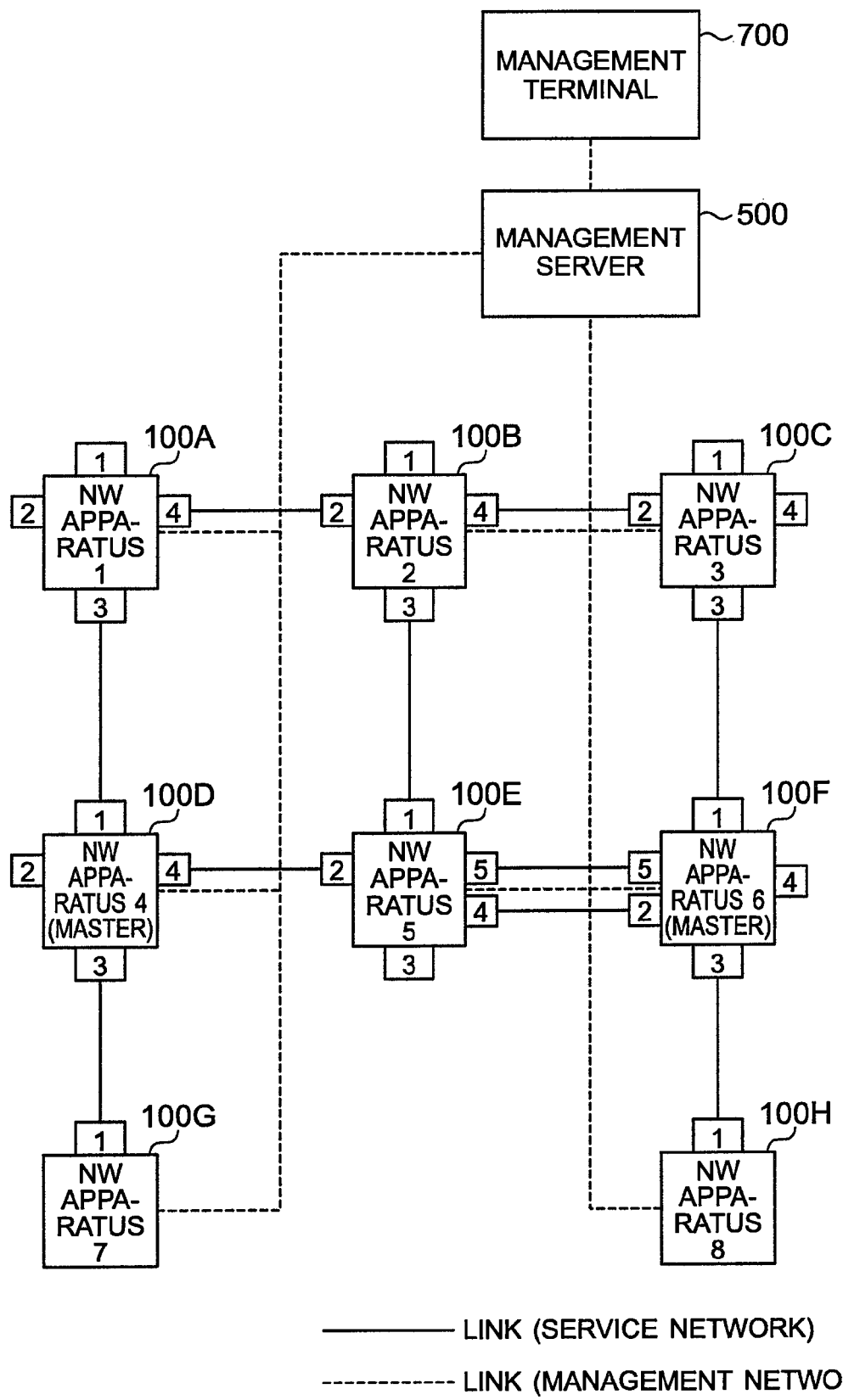
FIG. 1 is a diagram illustrating an example of the configuration of a network management system and a management target networks.

FIG. 1 is a diagram illustrating a system configuration. This system configuration diagram illustrates an example of a network management apparatus and management target networks. The system configuration is constituted of a management terminal 700, a management server 500, an NW apparatus 1 100A, an NW apparatus 2 100B, an NW apparatus 3 100C, an NW apparatus 4 (master) 100D, an NW apparatus 5 100E, an NW apparatus 6 (master) 100F, an NW apparatus 7 100G, and an NW apparatus 8 100H.

The management terminal 700 is a terminal for displaying information received from the management server 500 connected by a link of a management network. The management server 500 collects information on ports, physical connections and the like from each NW apparatus connected via links of a management network and manages the collected information.

The NW apparatus 1 100A to NW apparatus 8 100H are NW apparatuses to be managed by the management server 500.

The NW apparatus 1 100A is connected to other NW apparatuses via links of a service network to constitute the network, and is used for relaying communication data. The NW apparatus 1 100A is connected to the NW apparatus 2 100B and NW apparatus 4 100D directly via links of the service network, and constitutes a ring together with the NW apparatus 2 100B, NW apparatus 4 100D and NW apparatus 5 100E.

The NW apparatus 2 100B is connected to other NW apparatuses via links of the service network to constitute the network, and is used for relaying communication data.

The NW apparatus 2 100B is connected to the NW apparatus 1 100A, NW apparatus 3 100C and NW apparatus 5 100E directly via links of the service network, constitutes a ring together with the NW apparatus 1 100A, NW apparatus 4 100D and NW apparatus 5 100E, and also constitutes a ring together with the NW apparatus 3 100C, NW apparatus 5 100E and NW apparatus 6 100F.

The NW apparatus 3 100C is connected to other NW apparatuses via links of the service network to constitute the network, and is used for relaying communication data. The NW apparatus 3 100C is connected to the NW apparatus 2 100B and NW apparatus 6 100F directly via links of the service network, and constitutes a ring together with the NW apparatus 2 100B, NW apparatus 5 100E and NW apparatus 6 100F.

The NW apparatus 4 100D is connected to other NW apparatuses via links of the service network to constitute the network, and is used for relaying communication data. The NW apparatus 4 100D is connected to the NW apparatus 1 100A, NW apparatus 5 100E and NW apparatus 7 100G directly via links of the service network, and constitutes a ring together with the NW apparatus 1 100A, NW apparatus 2 100B and NW apparatus 5 100E. The NW apparatus 4 100D has a role of master for controlling this ring.

The NW apparatus 5 100E is connected to other NW apparatuses via links of the service network to constitute the network, and is used for relaying communication data. The NW apparatus 5 100E is connected to the NW apparatus 2 100B, NW apparatus 4 100D and NW apparatus 6 100F directly via links of the service network, and constitutes a ring together with the NW apparatus 1 100A, NW apparatus 2 100B and NW apparatus 4 100D. The NW apparatus 5 100E forms Link Aggregation (LA) together with two links to the NW apparatus 6 100F.

The NW apparatus 6 100F is connected to other NW apparatuses via links of the service network to constitute the network, and is used for relaying communication data. The NW apparatus 6 100F is connected to the NW apparatus 3 100C, NW apparatus 5 100 E and NW apparatus 8 100H directly via links of the service network, constitutes a ring together with the NW apparatus 2 100B, NW apparatus 3 100C and NW apparatus 5 100E, and has a role of master for controlling this ring. The NW apparatus 6 100F forms Link Aggregation (LA) together with two links to the NW apparatus 5 100E.

The NW apparatus 7 100G is connected to another NW apparatuses via a link of the service network to be connected to the network, and is used for relaying communication data. The NW apparatus 7 100G is directly connected to the NW apparatus 4 100D via the link of the service network.

The NW apparatus 8 100H is connected to another NW apparatuses via a link of the service network to be connected to the network, and is used for relaying communication data. The NW apparatus 8 100H is directly connected to the NW apparatus 6 100F via the link of the service network.

Figure 2:
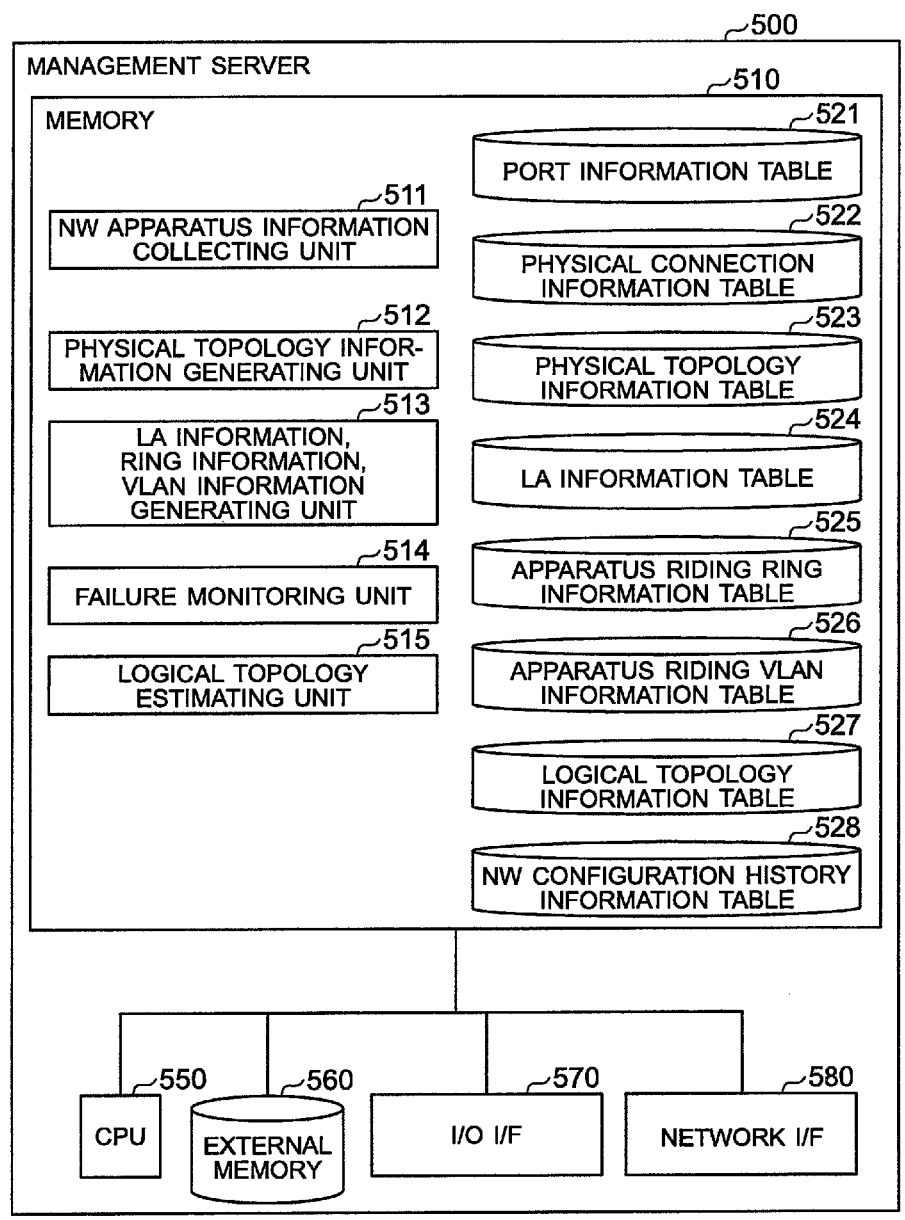
FIG. 2 is a diagram illustrating an example of the structure of a management server.

FIG. 2 illustrates the structure of the management server. The management server 500 collects and manages information on ports, physical connections and the like from the NW apparatuses connected by the links of the management network. The management server is constituted of; an NW apparatus information collecting unit 511; a physical topology information generating unit 512; an LA information, ring information, VLAN information generating unit 513; a failure monitoring unit 514; a logical topology estimating unit 515; a port information table 521; a physical connection information table 522; a physical topology information table 523; an LA information table 524; an apparatus striding ring information table 525; an apparatus striding VLAN information table 526; a logical topology information table 527; an NW configuration history information table 528, respectively loaded in a memory 510; a CPU 550, an external memory 560; an I/O I/F 570; and a network I/F 580. The units 511 to 515 are actually stored in the memory, and the functions thereof are executed by CPU.

The NW apparatus information collecting unit 511 collects information such as the port information table 521 from the NW apparatuses. The physical topology information generating unit 512 generates physical topology information from the physical connection information table 522 collected from the NW apparatuses, the physical topology information indicating which links connect the apparatuses. The LA information, ring information, VLAN information generating unit 513 generates information riding a plurality of NW apparatuses such as LA, rings and VLANs from various pieces of setting information collected from the NW apparatuses.

The failure monitoring unit 514 monitors whether a failure occurs in NW apparatuses by receiving a failure notice from an NW apparatus or inquiring an NW apparatus. The logical topology estimating unit 515 estimates a logical topology at a particular time point from logical network information generated in accordance with various pieces of setting information collected from the NW apparatuses and failure information from the NW apparatuses.

The port information table 521 is a database for storing port information on the NW apparatuses. The details thereof are illustrated in FIG. 3. The physical connection information table 522 is a database for storing information on how each NW apparatus is physically connected. The details thereof are illustrated in FIG. 4. The physical topology information table 523 is a database for storing information on a physical topology generated from various pieces of information collected from the NW apparatuses. The details thereof are illustrated in FIG. 5. The LA information table 524 is a database for storing information on which ports of the NW apparatuses constitute link aggregation. The details thereof are illustrated in FIG. 6.

The apparatus riding ring information table 525 is a database for storing information on which NW apparatus group constitutes each ring. The details thereof are illustrated in FIG. 7. The apparatus riding VLAN information table 526 is a database for storing information on which NW apparatus group constitutes each VLAN. The details thereof are illustrated in FIG. 8. The logical topology information table 527 is a database for storing information on a logical topology (VLAN) reflecting LA and rings. The details thereof are illustrated in FIG. 9. The NW configuration history information table 528 is a database for storing NW configuration information such as physical topologies and logical topologies at a plurality of time points. The details thereof are illustrated in FIG. 10.

CPU 550 is a processor for executing and processing the function of each unit stored in the memory. The external memory 560 stores permanently the execution results and intermediate states of the function of each unit. The I/O I/F 570 controls input/output for the function of each unit stored in the memory. The network I/F 580 is a link to each NW apparatus for communications.

FIG. 3 illustrates the port information table. The port information table is used for managing port information of each NW apparatus, and has terms including an NW apparatus ID 5211, NW apparatus identification information 5212, a port ID 5213, and port identification information 5214. The NW apparatus ID 5211 is assigned to each NW apparatus uniquely, and has a role of identifying the NW apparatus.

The NW apparatus identification information 5212 is given uniquely to each UW apparatus among all NW apparatuses, and has a role of identifying each NW apparatus among all apparatuses. The port ID 5213 is given uniquely to each port of the NW apparatus, and has a role of identifying each port of the NW apparatus. The port identification information 5214 is given uniquely to each port among all ports of all NW apparatuses, and has a role of identifying each port among all ports of all NW apparatuses.

FIG. 4 illustrates the physical connection information table. The physical connection information table is used for managing adjacent port information possessed by each NW apparatus, and has terms including an NW apparatus ID 5221, an own port ID 5222, and adjacent port identification information 5233. The NW apparatus ID 5221 is given uniquely to each NW apparatus, and has a role of identifying each NW apparatus.

The own port ID 5222 has a role of identifying a port, used as an origin for physical connection management, of the NW apparatus. The adjacent port identification information 5233 has a role of indicating that which port is connected relative to the origin port. The adjacent port identification information stores information corresponding to the port identification information 5214 in order to uniquely identify the port opposing the origin port.

FIG. 5 illustrates the physical topology information table. The physical topology information table is used for managing how the NW apparatuses are physically connected, and has terms including a link ID 5231, a connection NW apparatus 1 ID 5232, an NW apparatus 1 port ID 5233, a connection NW apparatus 2 ID 5234, an NW apparatus 2 port ID 5235, and a state 5236. The link ID 5231 has a role of managing a physical connection state of the NW apparatuses.

The connection NW apparatus 1 ID 5232 has a role of identifying an NW apparatus used as an origin for link management. The NW apparatus 1 port ID 5233 has a role of identifying a port of the NW apparatus as an origin for link management. The connection NW apparatus 2 ID 5234 has a role of identifying an NW apparatus used as the apparatus opposing the connection NW apparatus 1. The connection NW apparatus 2 port ID 5235 has a role of identifying the port of the NW apparatus opposing the connection NW apparatus 1 for link management. The state 5236 has a role of indicating whether the link is under operation (up) or at rest (down).

FIG. 6 illustrates the LA information table. The LA information table is used for managing the structure of link aggregation, and has terms including an LA ID 5241 and a link ID 5242 The LA ID 5241 has a role of uniquely identifying link aggregation. The link ID 5242 has a role of identifying a link group constituting link aggregation.

FIG. 7 illustrates the apparatus riding link information table. The apparatus riding link information table is used for managing which NW apparatus group constitutes a ring, and has terms including a ring ID 5251, constituting NW apparatuses 5252, a master node ID 5253, a forwarding port ID 5254, a blocking port ID 5255, a belonging VLAN ID 5256, and a state 5257.

The ring ID 5251 is given to each NW apparatus group constituting a ring, and has a role of identifying which NW apparatus group constitutes a ring. The constituting NW apparatuses 5252 have a role of indicating the NW apparatus group constituting a ring. The maser node ID 5253 has a role of indicating which NW apparatus is a master node as the NW apparatus controlling the ring.

The forwarding port ID 5254 has a role of indicating which port of the master node in the constituted ring is made open for communications. If the opened port constitutes LA, information capable of discriminating this LA is stored. The blocking port ID 5255 has a role of indicating which port of the master node in the constituted ring is made close for blocking communications. The belonging VLAN ID 5256 has a role of indicating a VLAN group belonging to the ring. The state 5257 has a role of whether the ring is in the state (normal) initially set or whether the ring is in the state (abnormal) in which the port to be opened is changed due to a failure.

FIG. 8 illustrates the apparatus riding VLAN information table. The apparatus riding VLAN information table is used for managing whether each VLAN is set to the port of which NW apparatus, and has terms including a VLAN ID 5261 and constituting NW apparatuses (assigned port Ids 5262). The VLAN ID 5261 has a role of indicating NW apparatuses constituting VLAN and a port information group. IDs of ports to which VLAN is set are indicated in parentheses.

FIG. 9 illustrates the logical topology table. The logical topology table is used for managing whether a logical network is represented by a topology of connecting which NW apparatuses, and has terms including a logical topology ID 5271, a corresponding VLAN, and a constituting link group (apparatus ID1, apparatus ID2). The logical topology indicates a route along which a frame is transferred actually.

The logical topology ID 5271 has a role of uniquely identifying a logical topology of VLAN. The opposing VLAN 5272 has a role of identifying VLAN having this logical topology. The constituting link group (apparatus ID1, apparatus ID2) 5273 has a role of indicating all logical links among NW apparatuses constituting a logical network. An origin of a link is indicated as the first numeral in the parentheses, and an end of the link is indicated at the second numeral in the parentheses.

FIG. 10 illustrates the NW configuration history information table. The NW configuration history information table is used for storing the past network configuration, and has terms including a history ID 5281, a store time 5282, a physical topology 5283 and a logical topology 5284.

The history ID 5281 has a role of uniquely identifying a history. The store time 5282 has a role of indicating a time when the network configuration is stored. The physical topology 5283 has a role of indicating the physical topology at the time when it is stored. Information on physical links in a certain time period illustrated in FIG. 5 is stored as the physical topology. The logical topology 5284 has a role of indicating the logical topology at the time when it is stored. Information of logical links in a certain time period illustrated in FIG. 9 is stored as the logical topology.

Figure 11:
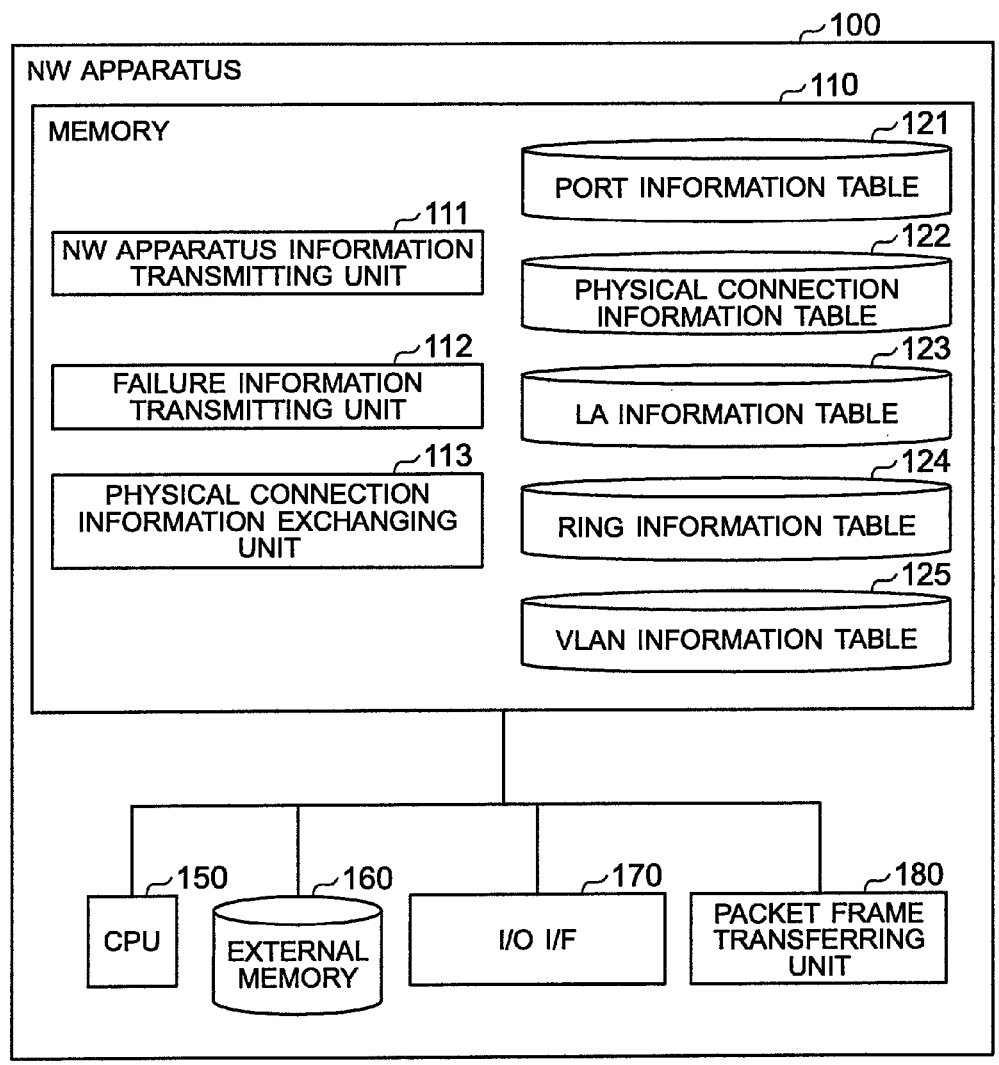
FIG. 11 is a diagram illustrating an example of an NW apparatus.

FIG. 11 illustrates the structure of an NW apparatus. The NW apparatus is used for connecting a plurality of NW apparatuses for data communications, and is constituted of an NW apparatus information transmitting unit 111, a failure information transmitting unit 112, a physical connection information exchanging unit 113, a port information table 121, a physical connection information table 122, an LA information table 123, a ring information table 124, a VLAN information table 125, a CPU 150, an external memory 160, an I/O I/F 170 and a packet frame transferring unit 180.

Functions of the units 111 to 113 are actually stored in the memory and executed by CPU. The NW apparatus information transmitting unit 111 transmits its own NW apparatus information in response to a request from an external system such as management server. The failure information transmitting unit 112 transmits failure information to the external system when its own module detects a failure. The physical connection exchanging unit 113 exchanges physical connection information with other physically connected NW apparatuses.

The port information table 121 is a database for storing identification information of each of its own ports. The details are illustrated in FIG. 12. The physical connection table 122 is a database for storing identification information of an adjacent port physically connected to each of its own ports. The details are illustrated in FIG. 13. The LA information table 123 is a database for storing information on which port group of its own constitutes Ling Aggregation (LA). The details are illustrated in FIG. 14. The ring information table 124 is a database for storing information on whether the NW apparatus constituting the ring is a master node for controlling the ring, information on which port is made open if the NW apparatus is a master node, and other information. The details are illustrated in FIG. 15. The VLAN information table 125 is a database for storing information on ports assigned to each VLAN. The details are illustrated in FIG. 16.

CPU 150 is a processor for executing and processing the function of each unit stored in the memory. The external memory 160 is used for permanently storing execution results and intermediate states of the function of each unit stored in the memory. The I/O I/F 170 controls input/output of the function of each unit stored in the memory. The packet frame transferring unit 180 transfers an IP packet or a frame to each physically connected NW apparatus.

FIG. 12 illustrates the port information table. The port information table is used for managing identification information of each port possessed by the NW apparatus itself, and has terms including a port ID 1211 and port identification information 1212. The port ID 1211 has a role of uniquely identifying each port of the NW apparatus. The port identification information 1212 has a role of uniquely identifying each port of all NW apparatuses.

FIG. 13 illustrates the physical connection information table. The physical connection information table is used for managing whether its own port is physically connected to a port of which NW apparatus, and has terms including a port ID 1221 and an adjacent port identification information 1222. The port ID 1221 has a role of uniquely identifying its own port of the NW apparatus. The adjacent port identification information 1222 has a role of uniquely identifying a corresponding port physically connected to each port of the NW apparatus in all NW apparatuses.

FIG. 14 illustrates the LA information table. This LA information table corresponds to the NW apparatus 5. The LA information table is used for indicating which port group constitutes LA, and has terms including an LA ID 1231 and a port 1232. The LA ID 1231 has a role of uniquely identifying LD. The port ID 1232 has a role of indicating a port belonging to LA.

FIG. 15 illustrates the ring information table. The ring information table is used for managing information on whether the NW apparatus constituting the ring is a master node for controlling the ring, information on which port is made open if the NW apparatus is a master node, and other information, and has terms including a ring ID 1241, a master node 1242, a forwarding port ID 1243, a blocking port ID 1244, and a belonging VLAN ID 1245.

The ring ID 1241 has a role of uniquely identifying a ring. The master node 1242 has a role of indicating whether the NW apparatus constituting the ring is a master node for controlling the ring (Yes) or not (No). The forwarding port ID 1243 has a role of indicating that information on which port of the maser node is made open for data transfer. If the NW apparatus is not a master node, the NW apparatus does not have this information.

The blocking port ID 1244 has a role of indicating which port is made close by the master node to block data. If the NW apparatus is not a master node, the NW apparatus does not have this information. The belonging VLAN ID 1245 has a role of indicating a VLAN group belonging to the ring. If the NW apparatus is not a master node, the NW apparatus does not have this information.

FIG. 16 illustrates the VLAN information table. The VLAN information table is used for managing which port is assigned to each VLAN, and has terms including a VLAN ID 1251 and an assignment port ID 1252. The VLAN ID 1251 has a role of uniquely identifying VLAN. The assignment port ID 1252 has a role of indicating a port group assigned to each VLAN.

FIG. 17 illustrates a network estimating process sequence. The operation sequence illustrates the order of each process to be executed by each of the management terminal 700, management server 500, NW apparatus 100A and NW apparatus 100B. The management server 500 issues a structure information request S101 to the NW apparatus 100A. The structure information request S101 is used for acquiring the structure information of the NW apparatus 100A.

The NW apparatus 100A issues a structure information return S102 to the management server 500. The structure information return S102 is used for notifying the structure information of the NW apparatus 100A to the requester. The management server 500 issues a structure information request S101 also to the NW apparatus 100B. The structure information request S101 is used for acquiring the structure information of the NW apparatus 100B.

The NW apparatus 100B issues a structure information return S102 to the management server 500. The structure information return S102 is used for notifying the structure information of the NW apparatus 100B to the requester. In this manner, the management server 500 acquires the structure information from each NW apparatus to be managed. The management server 500 acquires the port information table in FIG. 12, physical connection information table in FIG. 13, LA information table in FIG. 14, ring information table in FIG. 15 and VLAN information table in FIG. 16 of each NW apparatus.

Figure 19:
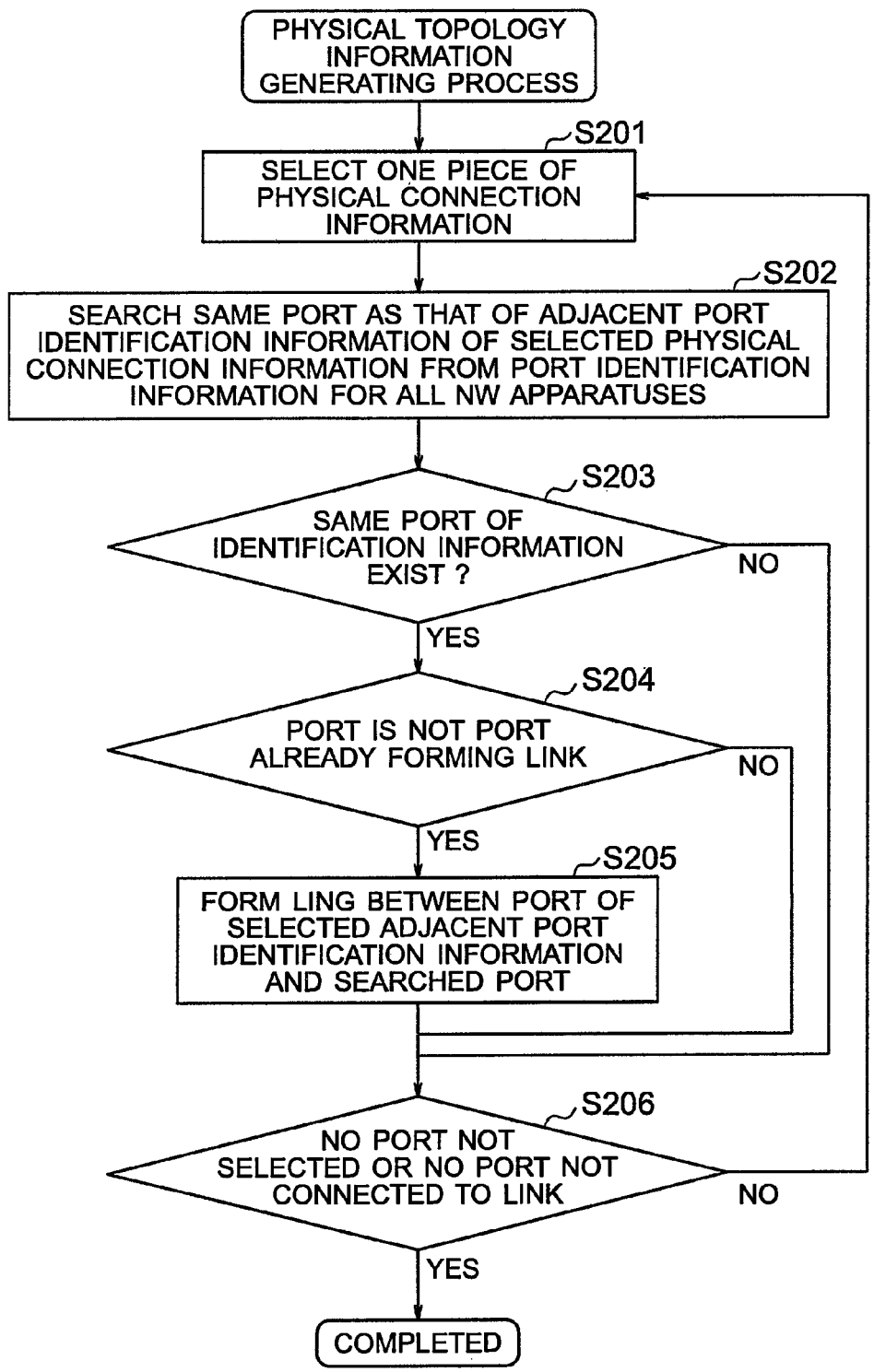
FIG. 19 is a flow chart illustrating a process of generating a physical topology.

In accordance with the acquired information, the management server 500 assigns a NW apparatus ID to each NW apparatus, and generates the port information table for all management target NW apparatuses illustrated in FIG. 3 and the physical connection information table for all management target NW apparatuses illustrated in FIG. 4. The management server 500 performs physical topology information generation S103 from the structure information acquired from each NW apparatus. The physical topology information generation S103 is used for generating information on how each NW apparatus is physically connected. The details are indicated in FIG. 19.

Next, the management server 500 performs LA information, apparatus riding ring information, apparatus riding VLAN information generation S104. The LA information, apparatus riding ring information, apparatus riding VLAN information generation S104 is used for generating information on which link group constitutes link aggregation and information on which NW apparatus group constitutes a ring and VLAN.

This process generates the LA information table for all management target NW apparatuses illustrated in FIG. 6, the apparatus riding ring information table illustrated in FIG. 7 and the apparatus riding VLAN information table illustrated in FIG. 8. After the above-described processes of generating various pieces of information, the management server 500 performs failure monitor start S105. The process of the failure monitor start S105 is used for starting a failure notice reception from each management target NW apparatus.

Consider now that a failure occurs at the NW apparatus 100B. The NW apparatus 100B issues a failure information notice S106 to the management server 500. The failure information notice S106 is used for making each NW apparatus notify the management server of information on a detection position and contents of a failure.

Figure 20:
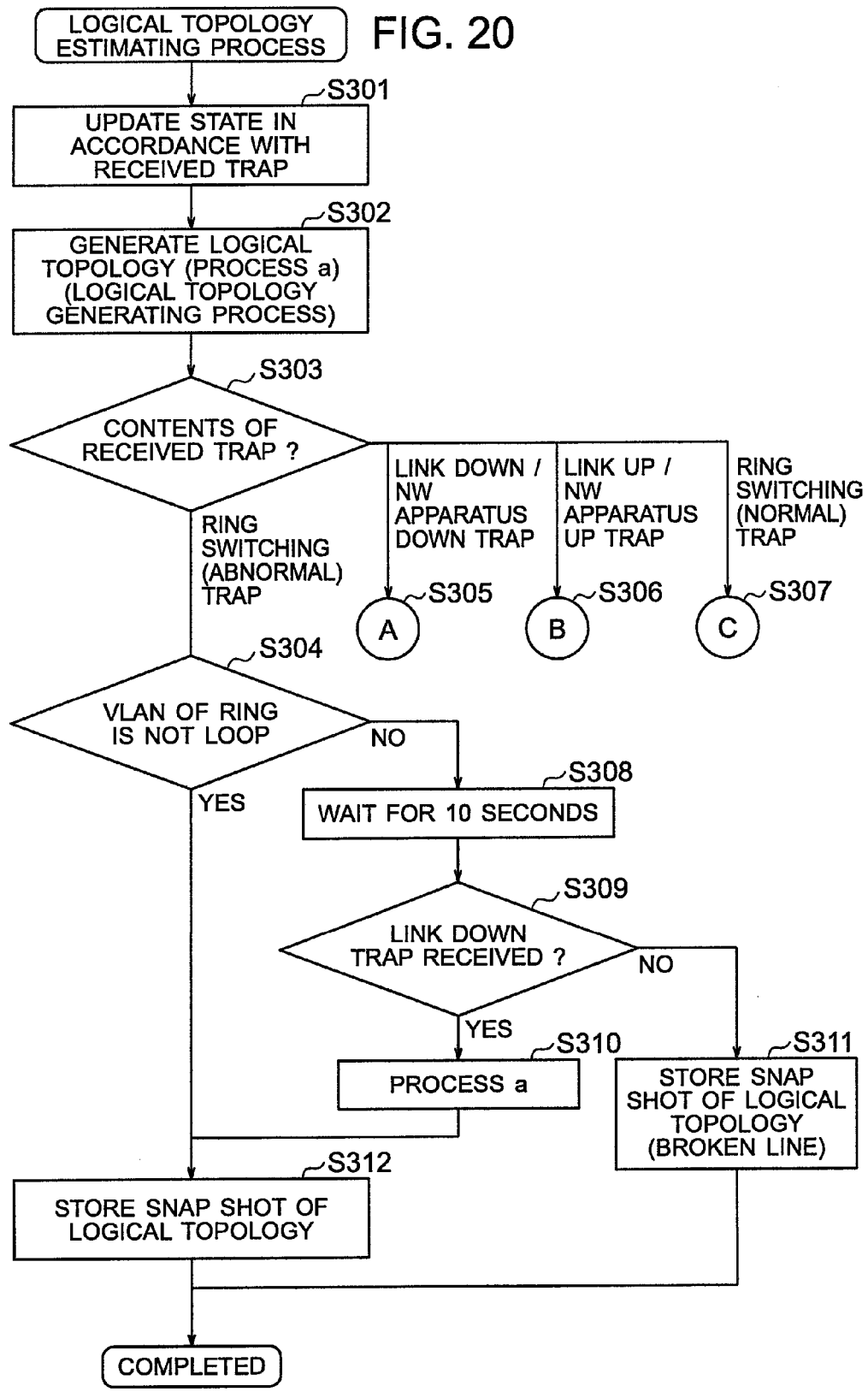
FIG. 20 is a flow chart illustrating a process of estimating a logical topology and acquiring a snap shot.

In accordance with the received failure information, the management server 500 performs a process of logical topology estimation S107. The logical topology estimation S107 is used for estimating a logical topology state after a failure occurrence from the managed physical topology information, and state information of the NW apparatuses and ports before a failure occurrence. The details are illustrated in FIG. 20. If a failure information notice S106 is issued during the logical topology estimation S107, the received failure information is stored in a queue, and after the process of the logical topology estimation S107 under execution is completed, the process of the logical topology estimation S107 is executed again in accordance with the failure information stored in the queue.

The process of the logical topology estimation S107 is repetitively executed each time the failure information notice S106 is issued. In this example, although the process of the logical topology estimation S107 is performed upon reception of the failure information notice issued at the event of a failure occurrence, this process may be performed at the event of a user process request.

The management server 500 performs failure information, estimated logical topology transmission S108 relative to the management terminal 700. The process of the failure information, estimated logical topology transmission S108 is used for transmitting the failure information received from each NW apparatus and the logical topology information estimated from the received failure information, to the management terminal.

The management terminal 700 performs map display (estimated logical topology) S109. The process of the map display (estimated logical topology) S109 is used for notifying a user of the failure information and estimated logical topology information received from the management server 500 in the format a user can easily understand.

FIG. 18 illustrates a list of messages to be notified to each system, the messages being a set of information notified among systems described with reference to FIG. 17. The structure information request message is a message notified by the structure information request S101 for acquiring structure information from each NW apparatus. A transmission source is the management server, a transmission destination is the NW apparatus, and the contents are the structure information transmission request.

The structure information notice message is a message notified by the structure information notice S102 and being used by each NW apparatus to notify its own structure information to the management server. A transmission source is the NW apparatus, a transmission destination is the management server, and the contents are the structure information of the NW apparatus such as port information, physical connection information, LA information, ring information and VLAN information.

The failure information notice message is a message notified by the failure information notice S106 and being used by each NW apparatus to notify its own detected failure information to the management server. A transmission source is the NW apparatus, a transmission destination is the management server, and the contents are failure information such as link up/down, apparatus up/down, and ring switching (to an abnormal state/to a normal state).

The estimated logical topology transmission message is a message regarding an estimated logical topology notified by the failure information, estimated logical topology transmission S108 and transmitting logical topology information estimated by the management server from the failure information, to the management terminal. A transmission source is the management server, a transmission destination is a management terminal, and the contents are the estimated logical topology.

FIG. 19 is a flow chart illustrating a physical topology generating process. The physical topology generating process generates information on a topology of how NW apparatuses are physically connected, in accordance with the structure information collected from each NW apparatus. The physical topology generating process is executed by the physical topology information generating unit 511.

First, one piece of the physical connection information is selected at S201. The same port as that of the adjacent port of the selected physical connection information is searched from the port identification information of all NW apparatuses, at S202. Next, it is judged at S203 whether the search result indicates that the same identification information port exists. If the judgment result is true, the process at S204 is executed, whereas if the judgment result is false, the process at S206 is executed.

If the judgment result at S203 is true, it is judged at S204 whether the searched port is not a port already forming a link. If the judgment result is true, the process at S205 is executed. If the judgment result is false, the process at S206 is executed. If the judgment result at S204 is true, a link is formed at S205 between the port identified by the selected adjacent port identification information and the searched port. If the judgment result at S203 is false, or the judgment result at S204 is false, or if the process at S205 is completed, it is judged at S206 whether a port not selected does not exist or a port not connected by a link does not exist. If the judgment result is false, the process returns to the process at S201 to repeat the processes S201 to S206.

FIG. 20 is a flow chart illustrating a process of estimating a logical topology and acquiring a snap shot. The process of estimating a logical topology and acquiring a snap shot estimates upon failure occurrence which network constitutes what logical topology, and stores the estimated network configuration. This process of estimating a logical topology and acquiring a snap shot is executed by the logical topology estimating unit 515.

The state is updated in accordance with a received trap at S301. The received trap used for conditional branch at this process includes four traps: a ring switching (from a normal state to an abnormal state) trap; a link down/NW apparatus down trap; a ring switching (from an abnormal state to a normal state) trap; and a link up/NW apparatus up trap. Since the received trap contains NW apparatus identification information, the NW apparatus issued the trap is discriminated from a correspondence between the NW apparatus identification information and NW apparatus ID in the table illustrated in FIG. 3.

The state update is a process of changing the state of managed network information in accordance with the trap notifying a failure. For example, if a link down trap of the port 4 of the NW apparatus 1 reaches, the state of a link having a link ID of "2" among the links stored in the physical connection information illustrated in FIG. 5 is changed to "down". All links between the NW apparatuses 1 and 2 are therefore broken. Records having the link between the NW apparatuses 1 and 2 among the logical topology information illustrated in FIG. 9, i.e., link information between the NW apparatuses 1 and 2 is deleted from the constituting link group of the logical topology IDs 1, 2, and 3.

Figure 24:
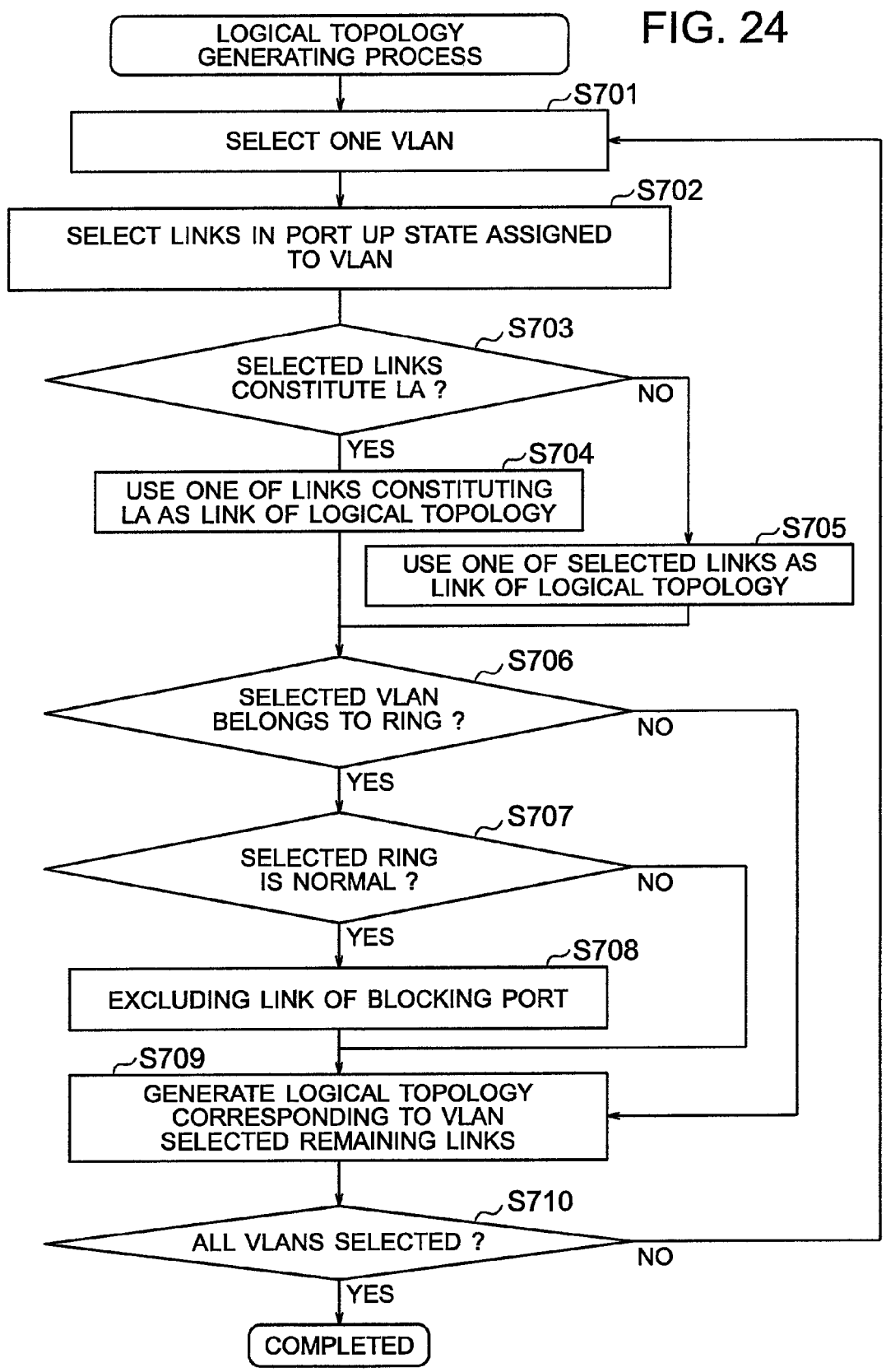
FIG. 24 is a flow chart illustrating a process of generating a logical topology.

Next, a logical topology is generated at S302 (process a). This process is called a process a, and the details thereof are illustrated in FIG. 24.

Figure 21:
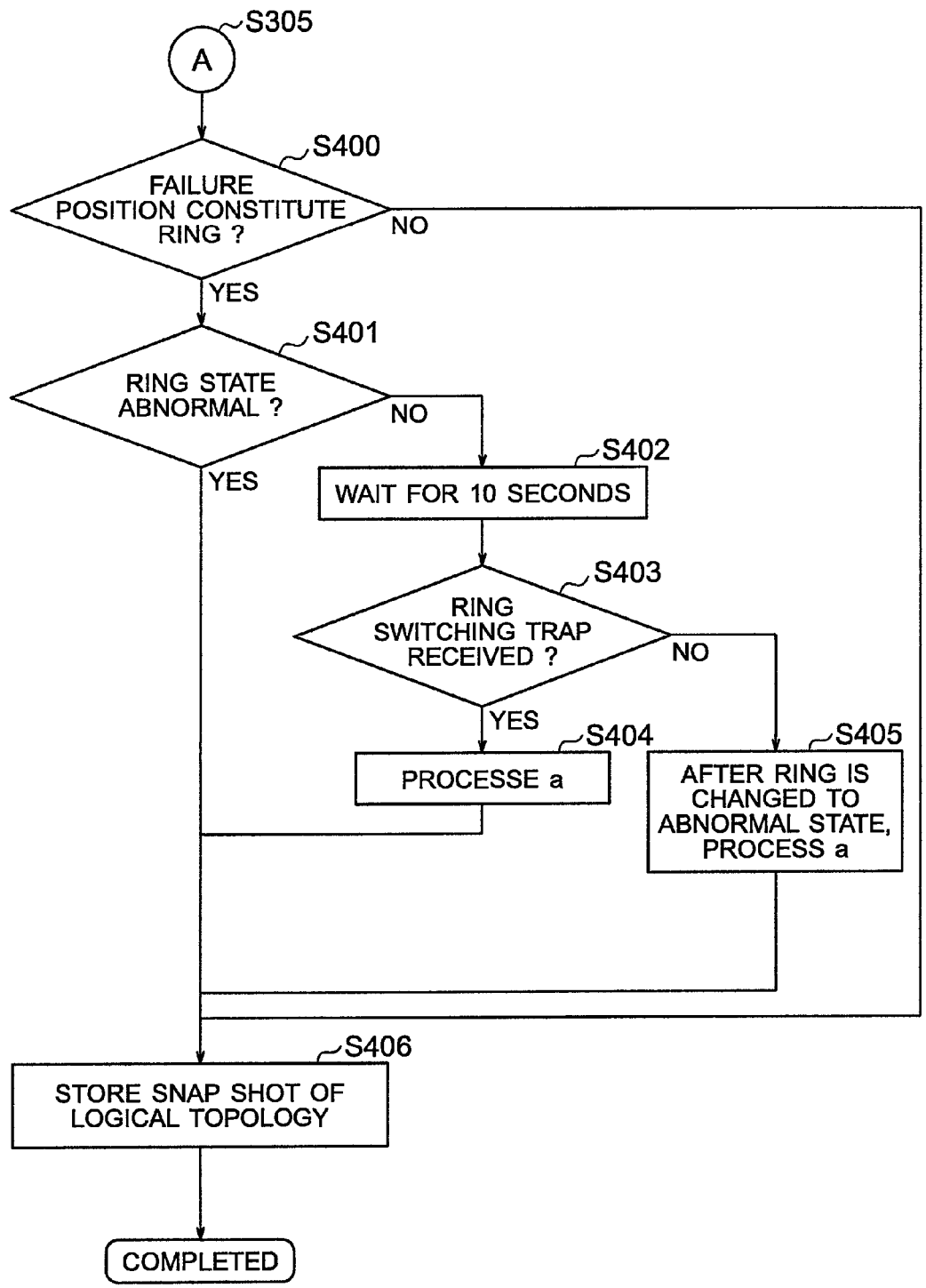
FIG. 21 is a flow chart illustrating a process of estimating a logical topology and acquiring a snap shot (after A).
Figure 22:
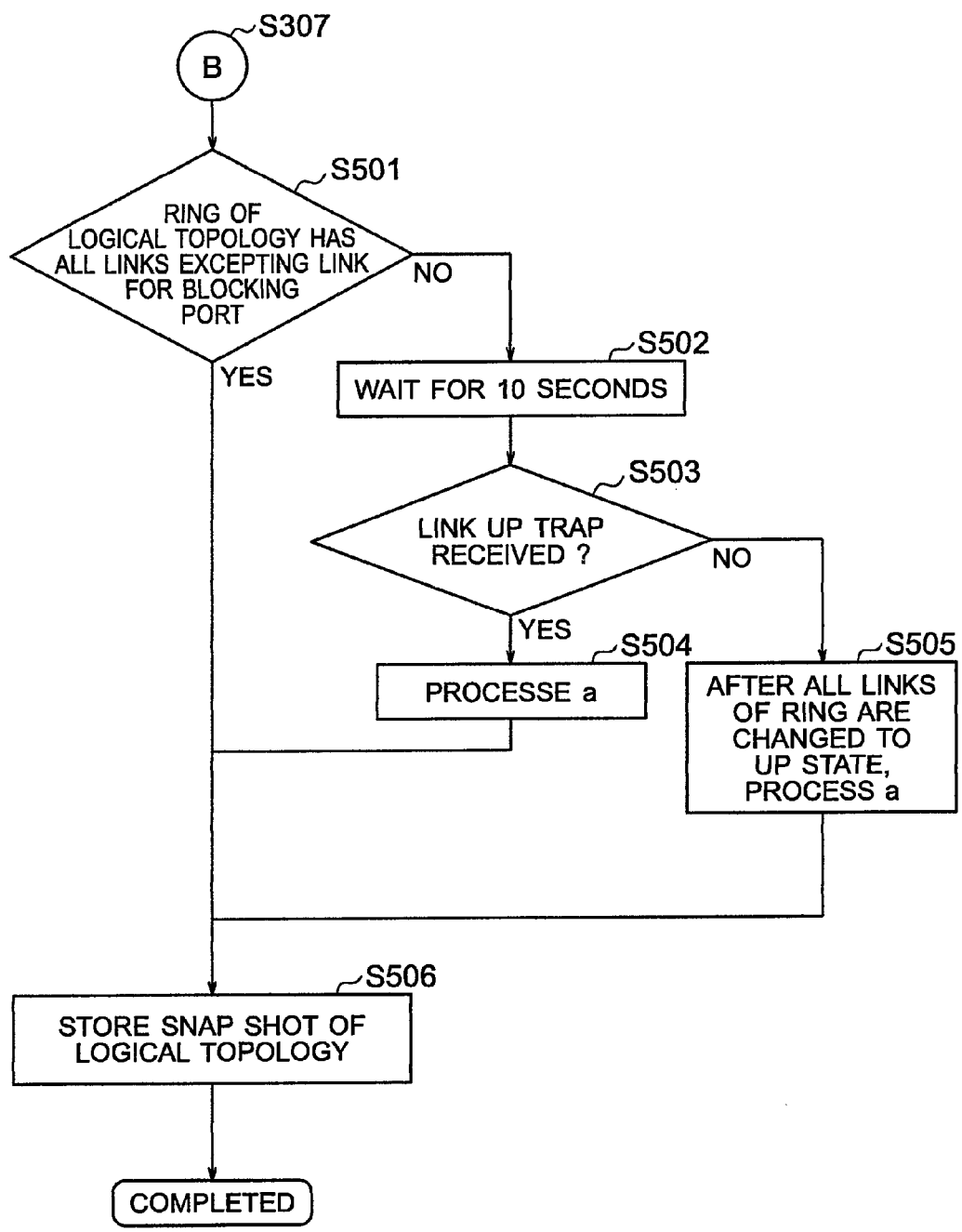
FIG. 22 is a flow chart illustrating a process of estimating a logical topology and acquiring a snap shot (after B).
Figure 23:
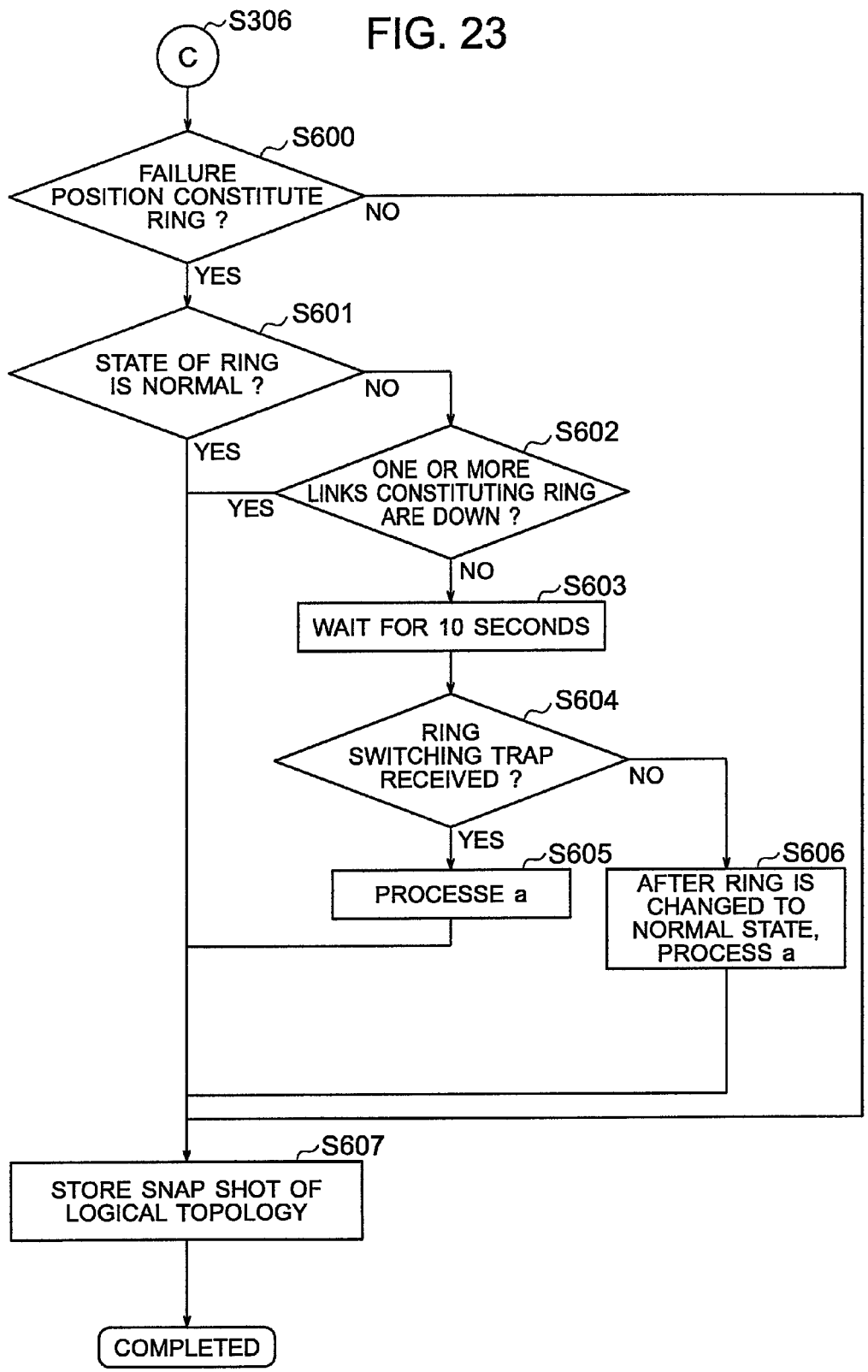
FIG. 23 is a flow chart illustrating a process of estimating a logical topology and acquiring a snap shot (after C).

Next, the contents of the received trap are judged at S303. If the judgment result indicates the link down/NW apparatus down trap, the process (A) at S305 and the following processes are executed. The details are illustrated in FIG. 21. If the judgment result indicates the ring switching (normal) trap, the process (B) at S306 and the following processes are executed. The details are illustrated in FIG. 22. If the judgment result indicates the link up/NW apparatus up trap, the process (C) at S307 and the following processes are executed. The details are illustrated in FIG. 23. If the judgment result indicates the ring switching (abnormal) trap, it is judged at S304 whether VLAN of the ring is not a loop. This judgment is performed in order to correctly record the estimated logical topology, by considering a failure cause which occurs frequently, because the arrival and order of traps to be received upon failure occurrence are not ensured.

If the judgment result at S304 is true, a snap shot of the logical topology is stored at S312 to thereafter terminate a series of processes. If the judgment result at S304 is false, a link down trap, which is considered to be issued essentially prior to the abnormal ring, is waited for a period of 10 seconds at S308. Although a wait time of 10 seconds is illustrated in FIG. 20, a proper wait time changes with the configuration of the management network so that this wait time is variable.

Next, it is judged at S309 whether the link down trap is received. If the judgment result is true, the process a at S310 is executed to generate a logical topology by considering the link down trap, and a snap shot of the logical topology is stored at S312 to thereafter terminate a series of processes. If the judgment result is false, it is considered that a link down trap, which is considered to be issued essentially prior to the abnormal ring, does not reach because of some cause.

This is because a protocol for notifying a trap is User Datagram Protocol (UDP) and trap arrival is not ensured. In this case, although the position of the ring down is not known, it is considered that the ring down trap does not reach even if the wait time is prolonged. In order to indicate an abnormal state, a snap shot of the logical topology is stored (broken line) at S311. Although the ring switching trap is received, the link down trap causing the ring switching trap is not able to be received. This state is discriminated from a usual snap shot by using a broken line as a connection state and storing the logical topology. After the snap shot is stored, a series of processes is completed.

FIG. 21 is a flow chart illustrating the process contents after (A) of the process of estimating a logical topology and acquiring a snap shot. This process is also executed by the logical topology estimating unit 515. If the judgment result at S303 of judging the contents of the received trap indicates the link down/NW apparatus down trap, it is judged at S400 whether the failure position constitutes a ring. If the judgment result is true, then it is judged at S401 whether the ring state is abnormal. If the judgment result is false, a snap shot of the logical topology is stored at S406 to thereafter terminate a series of processes.

If the judgment result at S401 is true, there is integrity with the received link down/NW apparatus down, and a snap shot of the logical topology is stored at 5406 to thereafter terminate a series of processes. If the judgment result is false, it is considered that the ring switching trap to be issued essentially is still not received, so that this trap is waited for a period of 10 seconds at S402. Although a wait time of 10 seconds is illustrated in FIG. 21, a proper wait time changes with the configuration of the management network so that this wait time is variable.

Next, it is judged at S403 whether the ring switching trap is received. If the judgment result is true, the process a is executed at S404, and a snap shot of the logical topology is stored at S406 to thereafter terminate a series of processes. If the judgment result of ring changing trap reception is false, it is considered that the ring switching trap does not reach by some reason, and the ring is changed to an abnormal state to thereafter execute the process a. Thereafter, a snap shot of the logical topology is stored at S406 to thereafter terminate a series of processes.

FIG. 22 is a flow chart illustrating the process contents after (B) of the process of estimating a logical topology and acquiring a snap shot. This process is also executed by the logical topology estimating unit 515. If the judgment result at S303 of judging the contents of the received trap indicates the ring switching (normal) trap, it is judged at S501 whether the ring of the logical topology has all links excepting a link for the blocking port. If the judgment result is true, it is considered that the state of the ring is recovered correctly to the initial state so that a snap shot of the logical topology is stored at S506 to thereafter terminate a series of processes. If the judgment result is false, it is considered that the link up trap to be issued essentially is still not received, so that this trap is waited for a period of 10 seconds at S502. Although a wait time of 10 seconds is illustrated in FIG. 22, a proper wait time changes with the configuration of the management network so that this wait time is variable.

Next, it is judged at S503 whether the link up trap is received. If the judgment result is true, the process a is executed at S504, and a snap shot of the logical topology is stored at S506 to thereafter terminate a series of processes. If the judgment result at S503 is false, it is considered that the link up trap to be essentially issued does not reach by some reason, and all links of the ring are changed to the up state to thereafter execute the process a at S505. Thereafter, a snap shot of the logical topology is stored at S506 to thereafter terminate a series of processes.

FIG. 23 is a flow chart illustrating the process contents after (C) of the process of estimating a logical topology and acquiring a snap shot. This process is also executed by the logical topology estimating unit 515. If the judgment result at S303 of judging the contents of the received trap indicates the link up/NW apparatus up trap, it is judged at S600 whether a failure position constitutes a ring. If the judgment result is true, then it is judged at S601 whether the state of the ring is normal. If the judgment result is false, a snap shot of the logical topology is stored at S607 to thereafter terminate a series of processes.

If the judgment result at S601 is true, there is integrity with the received link up/NW apparatus up trap, and a snap shot of the logical topology is stored at S607 to thereafter terminate a series of processes.

If the judgment result is false, it is judged at S602 whether one or more links constituting the ring are down. If the judgment result is true, a snap shot of the logical topology is stored at S607 to thereafter terminate a series of processes.

If the judgment result is false, it is considered that the ring switching trap to be issued essentially is still not received, so that this trap is waited for a period of 10 seconds at S603. Although a wait time of 10 seconds is illustrated in FIG. 23, a proper wait time changes with the configuration of the management network so that this wait time is variable.

Next, it is judged at S604 whether the ring switching trap is received. If the judgment result is true, the process a is executed at S605 by considering the ring switching trap, and a snap shot of the logical topology is stored at S607 to thereafter terminate a series of processes. If the judgment result at S604 is false, no abnormal state appears in the links constituting the ring so that the ring is changed to the normal state and the process a is executed. Thereafter, a snap shot of the logical topology is stored at S607 to thereafter terminate a series of processes.

FIG. 24 is a flow chart illustrating the logical topology generating process. The logical topology generating process generates information on how the logical topology is changed upon reception of failure information. This process is executed by the logical topology estimating unit 515. First, one VLAN is selected from the apparatus riding VLAN information table illustrated in FIG. 8.

Next, by referring to the constituting NW apparatuses (assigned port IDs) 5262 of the apparatus riding VLAN information table in FIG. 8 and the physical topology information table illustrated in FIG. 5, links in the port up state assigned to VLAN are selected at S702. Next, by referring to the LA information table in FIG. 6, it is judged at S703 whether the selected links constitute LA.

If the judgment result is true, one of links constituting LA is used as a link of the logical topology at S704. If the judgment result is false, one of the selected links is used as a link of the logical topology at S705. The above-described process result is reflected upon the constituting link group (NW apparatus ID1, NW apparatus ID2) 5273 of the logical topology table in FIG. 9.

After the process S704 or process S705 is completed, it is judged at S706 by referring to the apparatus riding ring information table in FIG. 7 whether the selected VLAN belongs to a ring. If the judgment result is true, the process at S707 is executed, whereas if the judgment result is false, the process at S709 is executed.

If the judgment result at S706 is true, it is judged at S707 by referring to the apparatus riding ring information table in FIG. 7 whether the state of the selected ring is normal. If the judgment result is true, a blocking port is identified by referring to the apparatus riding ring information table in FIG. 7, and the link of the blocking port is excluded at S708. If the judgment result is false, the process at S709 is executed.

If the judgment result at S706 is false, if the judgment result at S707 is false, or if the process at S708 is completed, at S709 the logical topology is generated corresponding to VLAN selected the remaining links. The above-described process result is reflected upon the constituting link group (NW apparatus ID1, NW apparatus ID2) 5273 of the logical information table in FIG. 9.

Next, it is judged at S710 whether all VLANs are selected from the apparatus riding VLAN information table in FIG. 8. If the judgment result is true, it means that a series of processes has been completed. If the judgment result is false, the flow returns to the process at S701 to repeat the processes until all VLANs are selected.

Figure 25:
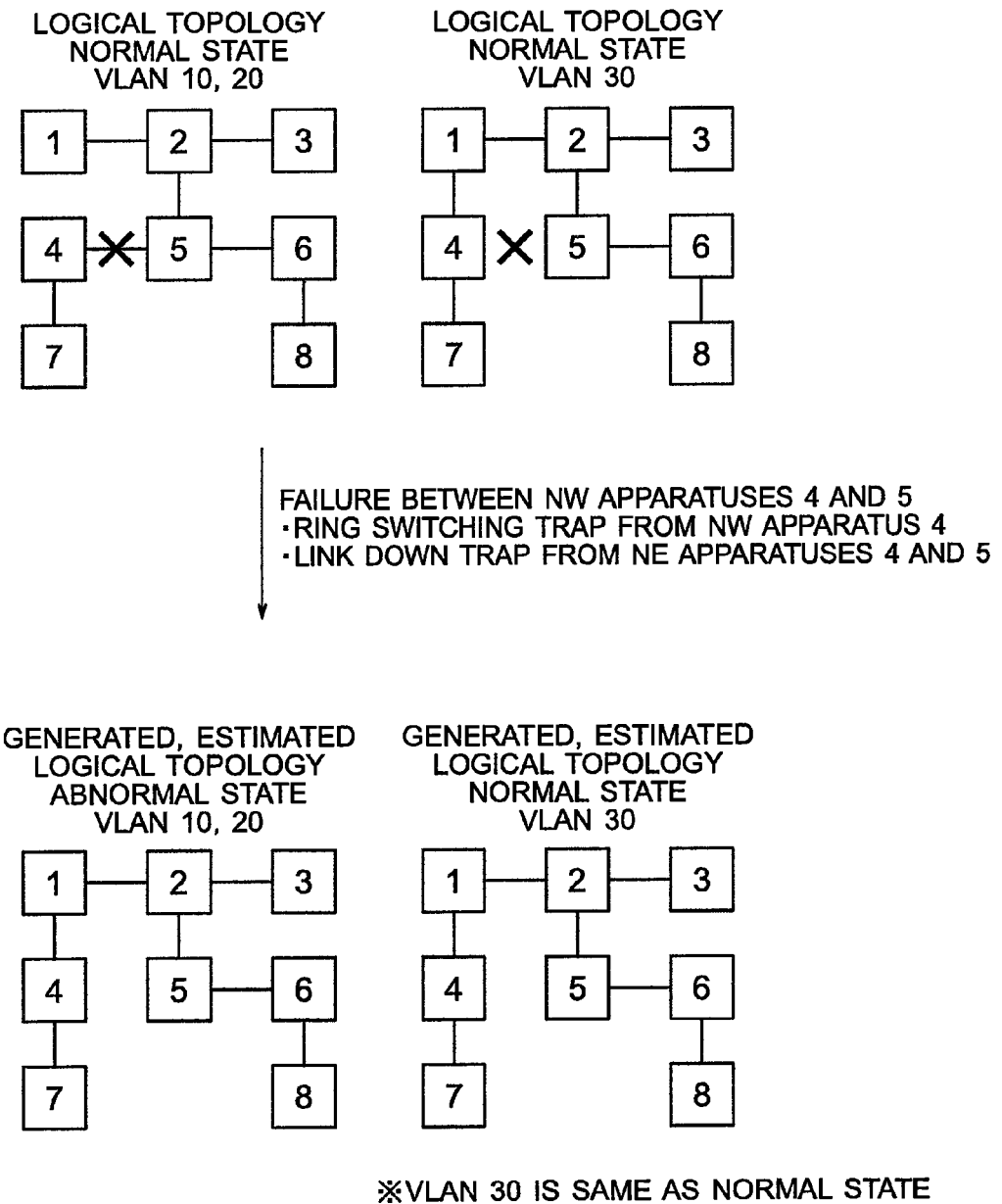
FIG. 25 is a diagram illustrating an example of generation of an estimated logical topology (pattern 1).

FIG. 25 illustrates examples of generation of an estimated logical topology when a failure occurs at a position where a ring of a network is constituted. Objects illustrated in FIG. 25 correspond to the NW apparatuses in the system configuration diagram of FIG. 1. It is first assumed that there are two rings (ring 1: NW apparatuses 1, 2, 4, 5, ring 2: NW apparatuses 2, 3, 5, 6) and that the logical topology corresponding to VLAN 10, 20 and the logical topology corresponding to VLAN 30 are constituted of NW apparatuses 1 to 8.

Consider now that a failure occurs between the NW apparatuses 4 and 5. As the failure occurs, the ring switching trap is notified from the NW apparatus 4 as a master node of the ring to the management server, and the link down trap is notified from the NW apparatuses 4 and 5 at failure position opposite ends to the management server.

VLAN 10, 20 has as a logical topology a link between the NW apparatuses 4 and 5. It is therefore considered that the logical topology is changed to use a link between the NW apparatuses 4 and 1 newly released by a ring redundancy operation. Namely, in this case, a generated, estimated logical topology has a broken link between the NW apparatuses 4 and 5 and a connected link between the NW apparatuses 1 and 4.

VLAN 30 dose not use the link between the NW apparatuses 4 and 5 having a failure as a communication link from the initial state, because the failure position is in front of the blocking port of the NW apparatus 4 as the master node. The estimated logical topology to be generated upon reception of a failure notice is therefore the same as that before a failure occurrence.

FIG. 26 illustrates examples of generation of an estimated logical topology when a failure occurs at a position where link aggregation of a network is constituted. Similar to FIG. 25, objects in FIG. 26 correspond to the NW apparatuses in the system configuration diagram in FIG. 1.

It is first assumed that link aggregation is formed between the NW apparatuses 5 and 6, and the logical topology corresponding to VLAN 10, 20 is constituted of the NW apparatuses 1 to 8. Consider now that a failure occurs between the NW apparatuses 5 and 6. The link down trap is notified to the management server from the NW apparatuses 4 and 5 at failure position opposite ends. In this case, it is assumed that only a partial portion of the links forming link aggregation by the failure becomes unable to communicate.

VLAN 10, 20 has a link between the NW apparatuses 5 and 6 as a logical topology. However, the links contain link aggregation, and even if a portion of the links becomes unable to communicate, communications are possible by using links with no failure. In this case, therefore, the generated, estimated logical topology is the same as that before failure occurrence.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A management apparatus for managing logical topology information among a plurality of communication apparatuses,
   wherein said management apparatus comprises one or more computers and:
   a first storage unit for managing ports of said communication apparatus assigned to each VLAN;
   a second storage unit for storing a physical connection relation between said ports of said communication apparatuses;
   a third storage unit for storing links indicating logical connections between said ports constituting link aggregation of said communication apparatus;
   a fourth storage unit for storing belongings of said VLAN to a link like a ring shape among said communication apparatuses;
   a logical topology estimating unit configured for generating a logical topology in accordance with said second and third storage units; and
   a monitoring unit configured for receiving state information from said communication apparatuses,
   wherein:
   a portion of information in said first to fourth storage units is updated in accordance with said state information acquired by said monitoring unit; and
   said logical topology estimating unit is configured for generating a logical topology by referring to said updated first to fourth storage units,
   wherein said management apparatus is configured:
   to select one VLAN by referring to said first storage unit;
   to select a link in a transferable state from links constituting ports assigned to said selected one VLAN, by referring to said second storage unit;
   to judge whether said selected link in a transferable state of a port constitutes link aggregation by referring to said third storage unit, and if said selected link constitutes link aggregation, one of the links constituting link aggregation is used as a link of said logical topology;
   to judge whether said selected one VLAN belongs to said ring, by referring to said fourth storage unit;
   to release a link in front of a blocking port if all links of the ring to which said selected one VLAN belongs are normal; and
   to generate a logical topology corresponding to links assigned to said selected one VLAN by using links other than the link in front of said blocking port,
   wherein said state information is one of:
   a first notice for notifying that an abnormal state occurs in a ring;
   a second notice for notifying that an abnormal state occurs in a link or said communication apparatus;
   a third notice for notifying that a ring recovers a normal state; and
   a fourth notice for notifying that a link or said communication apparatus recovers a normal state.

2. The management apparatus according to claim 1, wherein generation of said logical topology is performed in response to an event of a reception of said state information from said communication apparatus.

3. The management apparatus according to claim 1, wherein generation of said logical topology is performed in response to an event of a display request for said logical topology from a management terminal.

4. The management apparatus according to claim 1, wherein:
   if said first notice is received, after a generation process for said logical topology is completed, it is judged whether VLAN containing a ring changed by said first notice constitutes a loop; and
   if VLAN containing the changed ring constitutes a loop, said second notice is waited, and if said second notice is received, said logical topology is generated again in accordance with said received second notice.

5. The management apparatus according to claim 1, wherein:
   if said second notice is received, after a generation process for said logical topology is completed, it is judged whether a link changed by said second notice belongs to the ring; and
   if said changed link belongs to the ring, it is judged whether the ring is abnormal, and if not abnormal, said first notice is waited, and if said first notice is received, said logical topology is generated again in accordance with said received first notice.

6. The management apparatus according to claim 1, wherein:
   if said third notice is received, after a generation process for said logical topology is completed, it is judged whether all links other than a link in front of said blocking port of a ring changed in accordance with said third notice contained in said generated logical topology are normal; and if not normal, said fourth notice is waited, and if said fourth notice is received, said logical topology is generated again in accordance with said received fourth notice.

7. The management apparatus according to claim 1, wherein:
   if said fourth notice is received, after a generation process for said logical topology is completed, it is judged whether a link changed by said fourth notice belongs to a ring;
   if the changed link belongs to a ring, it is judged whether the ring is abnormal, and if the ring is abnormal, it is judged whether one or more links constituting the ring are down; and
   if down, said third notice is waited, and if said third notice is received, said logical topology is generated again in accordance with said received third notice.

8. The management apparatus according to any one of claims 4 to 7, further comprising a fifth storage unit for storing said generated logical topology in correspondence with a storage time.

9. The management apparatus according to any one of claims 1 to 7, wherein said first storage unit stores a first identifier for uniquely identifying VLAN, in correspondence with said communication apparatuses constituting VLAN and ports of said communication apparatuses.

10. The management apparatus according to any one of claims 1 to 7, wherein said second storage unit stores a second identifier for uniquely identifying a link, in correspondence with said communication apparatus constituting the link and ports of said communication apparatus.

11. The management apparatus according to any one of claims 1 to 7, wherein said third storage unit stores a third identifier for uniquely identifying link aggregation, in correspondence with said second identifier indicating a link constituting link aggregation.

12. The management apparatus according to any one of claims 1 to 7, wherein said fourth storage unit stores a fourth identifier for uniquely identifying a ring, in correspondence with said communication apparatus constituting the ring, a forwarding port and a blocking port of said communication apparatus managing the ring, said first identifier indicating belonging VLAN, and a state of the ring.

13. The management apparatus according to any one of claims 1 to 12, wherein information to be stored in said first to fourth storage units is constituted of structure information to be collected from said communication apparatuses.

14. A management system including a plurality of communication apparatuses and a management apparatus for managing logical topology information among said plurality of communication apparatuses, wherein:
   said management apparatus comprises comprises one or more computers and:
   a first storage unit for managing ports of said communication apparatus assigned to each VLAN;
   a second storage unit for storing a physical connection relation between said ports of said communication apparatuses;
   a third storage unit for storing links indicating logical connection between said ports constituting link aggregation of said communication apparatus;
   a fourth storage unit for storing belongings of said VLAN to a link like a ring shape among said communication apparatuses;
   a logical topology estimating unit configured for generating a logical topology in accordance with said second and third storage units; and
   a monitoring unit configured for receiving state information from said communication apparatuses, wherein: a portion of information in said first to fourth storage units is updated in accordance with said state information acquired by said monitoring unit; and said logical topology estimating unit generates a logical topology by referring to said updated first to fourth storage units; and
   said communication apparatus comprises:
   a fifth storage unit for storing, as structure information, a connection relation of ports between said communication apparatus and an opposing communication apparatus, link aggregation of the ports, belonging information of the ports to VLAN, and belonging information of the ports to a ring, wherein when a structure information request from said management apparatus is acquired, said structure information is returned,
   wherein said management apparatus is configured:
   to select one VLAN by referring to said first storage unit;
   to select a link in a transferable state from links constituting ports assigned to said selected one VLAN, by referring to said second storage unit;
   to judge whether said selected link in a transferable state of a port constitutes link aggregation by referring to said third storage unit, and if said selected link constitutes link aggregation, one of the links constituting link aggregation is used as a link of said logical topology;
   to judge whether said selected one VLAN belongs to said ring, by referring to said fourth storage unit;
   to release a link in front of a blocking port if all links of the ring to which said selected one VLAN belongs are normal; and
   to generate a logical topology corresponding to links assigned to said selected one VLAN by using links other than the link in front of said blocking port,
   wherein said state information is one of:
   a first notice for notifying that an abnormal state occurs in a ring;
   a second notice for notifying that an abnormal state occurs in a link or said communication apparatus;
   a third notice for notifying that a ring recovers a normal state; and
   a fourth notice for notifying that a link or said communication apparatus recovers a normal state.

15. The management system according to claim 14, wherein said communication apparatus exchanges connection information with another opposing communication apparatus.

* * * * *